(12) United States Patent
Wu et al.

(10) Patent No.: US 9,433,058 B2
(45) Date of Patent: Aug. 30, 2016

(54) DISPLAY PANEL

(71) Applicant: InnoLux Corporation, Miao-Li County (TW)

(72) Inventors: Cheng-Min Wu, Miao-Li County (TW); Chien-Feng Shih, Miao-Li County (TW); Sheng-Feng Huang, Miao-Li County (TW); Ming-Jhih Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/876,962

(22) Filed: Oct. 7, 2015

(65) Prior Publication Data

US 2016/0120005 A1    Apr. 28, 2016

(30) Foreign Application Priority Data

Oct. 27, 2014    (TW) .............................. 103136970 A

(51) Int. Cl.
*H01J 1/62* (2006.01)
*H05B 33/26* (2006.01)
*H05B 33/14* (2006.01)
*H05B 33/22* (2006.01)

(52) U.S. Cl.
CPC ............ *H05B 33/26* (2013.01); *H05B 33/145* (2013.01); *H05B 33/22* (2013.01)

(58) Field of Classification Search
CPC ....... H05B 33/26; H05B 33/45; H05B 33/22
USPC ......................................... 313/505, 506, 498
See application file for complete search history.

(56) References Cited

FOREIGN PATENT DOCUMENTS

| CN | 101887189 A | 11/2010 |
|---|---|---|
| CN | 101849255 B | 11/2012 |
| JP | 2008216357 A | 9/2008 |

*Primary Examiner* — Vip Patel
(74) *Attorney, Agent, or Firm* — Bacon & Thomas, PLLC

(57) ABSTRACT

A display panel is disclosed, having a display region and a non-display region out of the display region, wherein the display region comprises a central pixel region and a border pixel region disposed between the central pixel region and the non-display region, the display panel comprising: a first substrate; a second substrate; a display medium layer; a plurality of central pixel units located at the central pixel region and having a plurality of first electrodes disposed on the second substrate; and a plurality of border pixel units located at the border pixel region and having a plurality of second electrodes disposed on the second substrate; wherein outmost edges of a part of the adjacent border pixel units form a ladder-like shape, and a light output area of at least one of the border pixel units is smaller than that of at least one of the central pixel units.

20 Claims, 10 Drawing Sheets

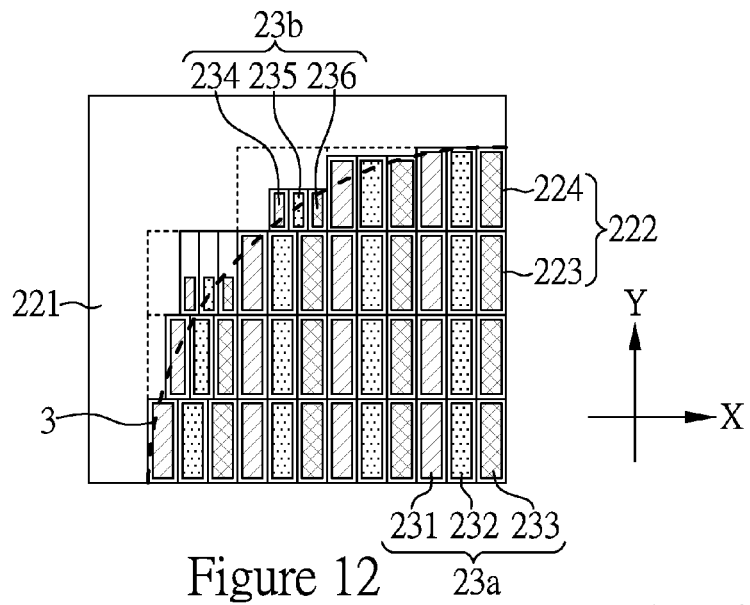
Figure 12
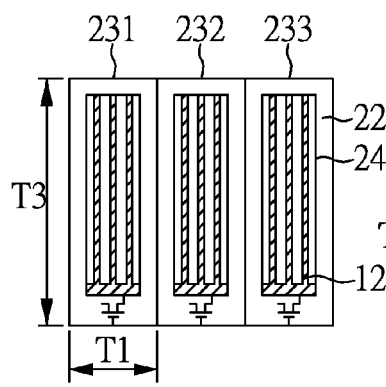 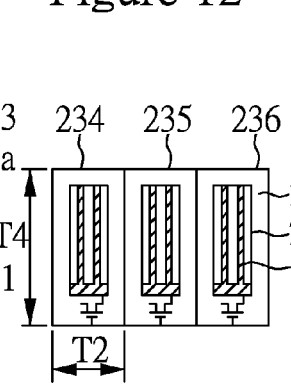 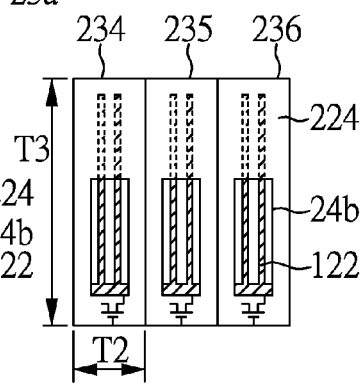
Figure 13A  Figure 13B  Figure 13C
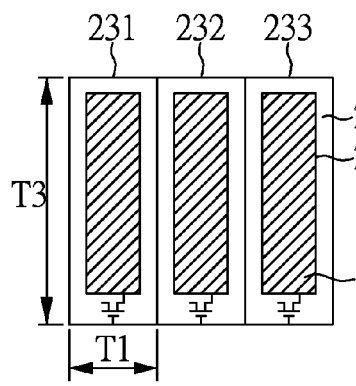 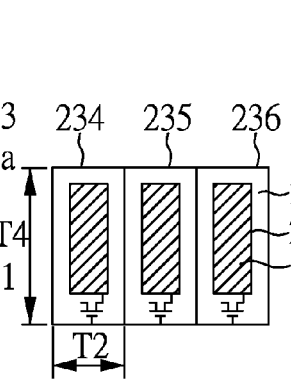 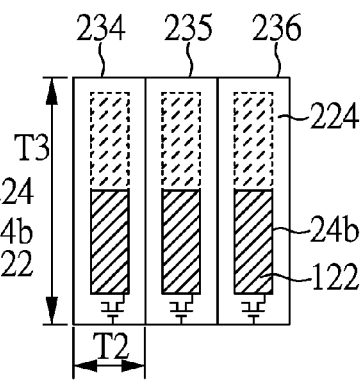
Figure 14A  Figure 14B  Figure 14C

DISPLAY PANEL

CROSS REFERENCE TO RELATED APPLICATION

This application claims the benefits of the Taiwan Patent Application Serial Number 103136970, filed on Oct. 27, 2014, the subject matter of which is incorporated herein by reference.

BACKGROUND OF THE INVENTION

1. Field of the Invention

The disclosure relates to a display panel, and particularly to a display panel having a substantially round display region.

2. Description of Related Art

With the progressing development of display technology, all the devices are developed following the trend of minimization, thinness, light weight and so on, and the mainstream display devices has evolved from cathode ray tubes to the thin display devices. In particular, the thin display devices can be applied in various fields, such as a watch, a mobile phone, a notebook computer, a camcorder, a camera, a music player, a mobile navigation device, a television and the like used in daily life.

A typical display device commonly has a square structure. In recent years, to comply with the demand for aesthetics and design, the display device has been designed as various different shapes, such as round, triangular, diamond and so on. However, all display devices need to be cut out from a mother substrate, regardless of the shape of the display device. With the development of the wearable display device such as watches etc., in order to cope with the round forms of common watches, it is desirable to develop a round display panel.

However, in a typical display panel, even though the panel can be cut with a curved border by a free-form cutting, since the pixel units in the display region are regularly arranged in an array, at a predetermined curved border, the pixel unit array will still present a zigzag border, rather than a genuine curved border, thus failing to meet the consumers' demand.

In view of the above, what is needed is to develop a display panel having a substantially round display region, to reach the users' demand for a round display panel.

SUMMARY OF THE INVENTION

An object of the disclosure is to provide a free-form display panel, wherein a border aperture region area or an electrode working region area of the border pixel black matrix corresponding to the border pixel units is designed to be smaller than a central aperture region area or an electrode working region area of the central pixel black matrix corresponding to the central pixel units, to improve the undesirable display problems in color and shape of the adjacent border pixel units of the black matrix on the non-display region in the free-form display panel.

To achieve the above object, the disclosure provides a free-form display panel, having a display region and a non-display region out of the display region, wherein the display region comprises a central pixel region and a border pixel region disposed between the central pixel region and the non-display region, the display panel comprising: a first substrate; a second substrate opposite to the first substrate; a display medium layer disposed between the first substrate and the second substrate; a plurality of central pixel units located at the central pixel region and having a plurality of first electrodes disposed on the second substrate; and a plurality of border pixel units located at the border pixel region and having a plurality of second electrodes disposed on the second substrate; wherein outmost edges of a part of the adjacent border pixel units form a ladder-like shape, and a light output area of at least one of the border pixel units is smaller than that of at least one of the central pixel units.

In the free-form display panel of the disclosure, the first electrodes and the second electrodes may have an identical structure. Alternatively, a part of the second electrodes may have a different structure from the first electrodes.

The free-form display panel of the disclosure further comprises: a first black matrix located at the non-display region and disposed on the first substrate; and a second black matrix located at the display region and disposed on the first substrate, wherein the second black matrix comprises a central pixel black matrix and a border pixel black matrix; wherein the central pixel black matrix spaces apart the central pixel units to form a plurality of central aperture regions to expose each of the first electrodes, while the border pixel black matrix spaces apart the border pixel units to form a plurality of border aperture regions to expose each of the second electrodes.

In the free-form display panel of the disclosure, the light output area of the central pixel units is a product of a working region area of the first electrodes exposed by the central aperture regions of the central pixel black matrix and the aperture ratio of the central pixel black matrix, while the light output area of the border pixel units is a product of a working region area of the second electrodes exposed by the border aperture regions of the border pixel black and the aperture ratio of the border pixel black matrix. Here, the aperture ratio of the central/border pixel black matrix is a ratio of the aperture region area of the central/border pixel black matrix to the central/border pixel region area, and the central/border pixel unit region area is defined by a central line between two adjacent edges of two adjacent central/border aperture regions corresponding to the central/border pixel unit region.

In the free-form display panel of the disclosure, at least one of the border aperture regions corresponding to the border pixel units comprises a first side and a second side substantially parallel to the first side, and a beveled edge intersects and is included between the first side and the second side.

In the free-form display panel of the disclosure, at least one of the central pixel units comprises a first central sub-pixel unit, a second central sub-pixel unit and a third central sub-pixel unit, and at least one of the border pixel units comprises a first border sub-pixel unit, a second border sub-pixel unit and a third border sub-pixel unit, wherein each of the first central sub-pixel unit and the first border sub-pixel unit presents a first color, each of the second central sub-pixel unit and the second border sub-pixel unit presents a second color, and each of the third central sub-pixel unit and the third border sub-pixel unit presents a third color, wherein the first color, the second color and the third color are different. A light output area of the first border sub-pixel unit is smaller than that of the first central sub-pixel unit, a light output area of the second border sub-pixel unit is smaller than that of the second central sub-pixel unit, and a light output area of the third border sub-pixel unit is smaller than that of the third central sub-pixel unit.

In the free-form display panel of the disclosure, the light output areas of the first border sub-pixel unit, the second border sub-pixel unit and the third border sub-pixel unit are smaller than those of the first central sub-pixel unit, the second central sub-pixel unit and the third central sub-pixel unit, respectively. In a part of the border pixel units, the border aperture regions of the border pixel black matrix corresponding to the first border sub-pixel unit, the second border sub-pixel unit and the third border sub-pixel unit may be smaller than the central aperture regions of the central pixel black matrix corresponding to the first central sub-pixel unit, the second central sub-pixel unit and the third central sub-pixel unit, respectively. Alternatively, in a part of the border of the pixel unit, working regions of the second electrodes exposed by the border aperture regions of the border pixel black matrix corresponding to the first border sub-pixel unit, the second border sub-pixel unit and the third border sub-pixel unit may be smaller than working regions of the first electrodes exposed by the central aperture regions of the central pixel black matrix corresponding to the first central sub-pixel unit, the second central sub-pixel unit and the third central sub-pixel unit, respectively. Alternatively, in a part of the border of the pixel unit, the border aperture regions of the border pixel black matrix corresponding to the first border sub-pixel unit, the second border sub-pixel unit and the third border sub-pixel unit and working regions of the second electrodes exposed thereby may be smaller than the central aperture regions of the central pixel black matrix corresponding to the first central sub-pixel unit, the second border sub-pixel unit and the third central sub-pixel unit and working regions of the first electrodes exposed thereby, respectively.

In the free-form display panel of the disclosure, in one of the border pixel units, the first border sub-pixel unit, the second border sub-pixel unit and the third border sub-pixel unit have substantially the same light output areas.

In the free-form display panel of the disclosure, in each of the central pixel units, the first central sub-pixel unit, the second central sub-pixel unit and the third central sub-pixel unit are arranged along a first direction, while in each of the border pixel units, the first border sub-pixel unit, the second border sub-pixel unit and the third border sub-pixel unit are arranged along the first direction. In a part of the border pixel units, widths of the first border sub-pixel unit, the second border sub-pixel unit and the third border sub-pixel unit in the first direction are smaller than widths of the first central sub-pixel unit, the second central sub-pixel unit and the third central sub-pixel unit in the first direction, respectively. Alternatively, in a part of the border pixel units, the widths of the first border sub-pixel unit, the second border sub-pixel unit and the third border sub-pixel unit in a second direction are smaller than the widths of the first central sub-pixel unit, the second central sub-pixel unit and the third central sub-pixel unit in the second direction, respectively, and the second direction is substantially perpendicular to the first direction. Alternatively, in a part of the border pixel units, the widths of the first border sub-pixel unit, the second border sub-pixel unit and the third border sub-pixel unit in the first direction and the second direction are smaller than the widths of the first central sub-pixel unit, the second central sub-pixel unit and the third central sub-pixel unit in the first direction and the second direction, respectively.

In the free-form display panel of the disclosure, the first border sub-pixel unit, the second border sub-pixel unit and the third border sub-pixel unit are arranged sequentially along a first direction, wherein outmost edges of the first border sub-pixel unit, the second border sub-pixel unit and the third border sub-pixel unit form a ladder-like shape, and the border aperture region of the border pixel black matrix corresponding to the first border sub-pixel unit is smaller than the border aperture region of the border pixel black matrix corresponding to the second border sub-pixel unit, while the border aperture region of the border pixel black matrix corresponding to the second border sub-pixel unit is smaller than the border aperture region of the border pixel black matrix corresponding to the third border sub-pixel unit.

In addition, the disclosure further provides a free-form display panel, having a display region and a non-display region out of the display region, wherein the display region comprises a central pixel region and a border pixel region disposed between the central pixel region and the non-display region, the display panel comprising: a first substrate; a second substrate opposite to the first substrate; a display medium layer disposed between the first substrate and the second substrate; a plurality of central pixel units located at the central pixel region and having a plurality of first electrodes disposed on the second substrate; and a plurality of border pixel units located at the border pixel region and having a plurality of second electrodes disposed on the second substrate; wherein at least one of the central pixel units includes a first central sub-pixel unit, a second central sub-pixel unit, and a third central sub-pixel unit, while at least one of the border pixel units includes a first border sub-pixel unit, a second border sub-pixel unit, and a third border sub-pixel unit, and the first central sub-pixel unit, the second central sub-pixel unit and the third central sub-pixel unit are arranged along a first direction, while the first border sub-pixel unit, the second border sub-pixel unit and the third border sub-pixel unit are arranged along a third direction, wherein the third direction forms an included angle with respect to the first direction, and sides of the first border sub-pixel unit, the second border sub-pixel unit and the third border sub-pixel unit intersecting the first direction are parallel to each other. Preferably, the included angle is between 10 degrees to 80 degrees. In addition, preferably, the sides of the first border sub-pixel unit, the second border sub-pixel unit and the third border sub-pixel unit have the same included angle with respect to the first direction. In addition, the central pixel units may be in a shape of a rectangle, and the border pixel units may be in a shape of a triangle. Furthermore, the free-form display panel further comprises: a first black matrix disposed in the non-display region and disposed on the first substrate; and a second black matrix disposed in the display region and disposed on the first substrate, wherein the first border sub-pixel unit is adjacent to the first black matrix, and the second border sub-pixel unit is disposed between the first border sub-pixel unit and the third border sub-pixel unit, wherein each of the first border sub-pixel unit and the second border sub-pixel unit is in a shape of a trapezoid, while the third border sub-pixel unit border is in a shape of a triangle. In addition, the second black matrix includes a central pixel black matrix and a border pixel black matrix, wherein the central pixel black matrix spaces apart the central pixel units to form a plurality of central aperture regions to expose each of the first electrodes, while the border pixel black matrix spaces apart the border pixel units to form a plurality of border aperture regions to expose each of the second electrodes; wherein in one of the border pixel units, the first border sub-pixel unit, the second border sub-pixel unit and the third border sub-pixel unit have substantially the same light output areas.

In the free-form display panel of the disclosure, by tailoring the border aperture region area exposed by the border pixel units or an electrode working region area of the border pixel units at the border pixel region, each of the first, second and third border sub-pixel units can exhibit the same brightness. Accordingly, the size and/or shape of the border pixel units can be made different from that of the central pixel units to realize the free-form display region without affecting the colors or brightness of the border pixel units at the border pixel region, thus enhancing the display quality of the free-form display panel.

BRIEF DESCRIPTION OF THE DRAWINGS

FIG. 12 shows a schematic diagram of parts of the free-form display panels according to Embodiments 5 and 6 of the disclosure.

FIGS. 13A to 13C show schematic diagrams of the central pixel units and the border pixel units of the free-form display panel according to Embodiment 5 of the disclosure.

FIGS. 14A to 14C show schematic diagrams of the central pixel units and the border pixel units of the free-form display panel according to Embodiment 6 of the disclosure.

DETAILED DESCRIPTION

Hereinafter, the exemplary embodiments of the disclosure will be described in detail. However, the disclosure is not limited to the embodiments disclosed below, but can be implemented in various forms. The following embodiments are described in order to enable those of ordinary skill in the art to embody and practice the disclosure, and those skilled in the art will appreciate that various modifications, additions and substitutions are possible.

Figure 1:
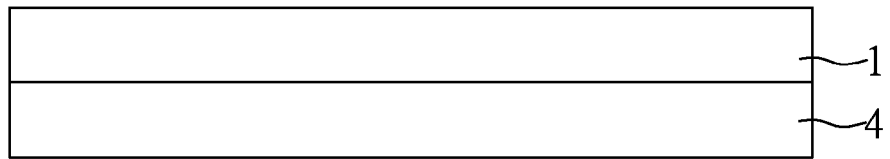
FIG. 1 shows a schematic cross-section of the free-form display device according to an embodiment of the disclosure.

FIG. 1 shows a schematic cross-section of the free-form display device according to an embodiment of the disclosure. The free-form display device of the embodiment comprises: a free-form display panel 1; and a backlight module 4 disposed below the free-form display panel, to provide a light for penetrating through the free-form display panel 1.

Figure 2A:
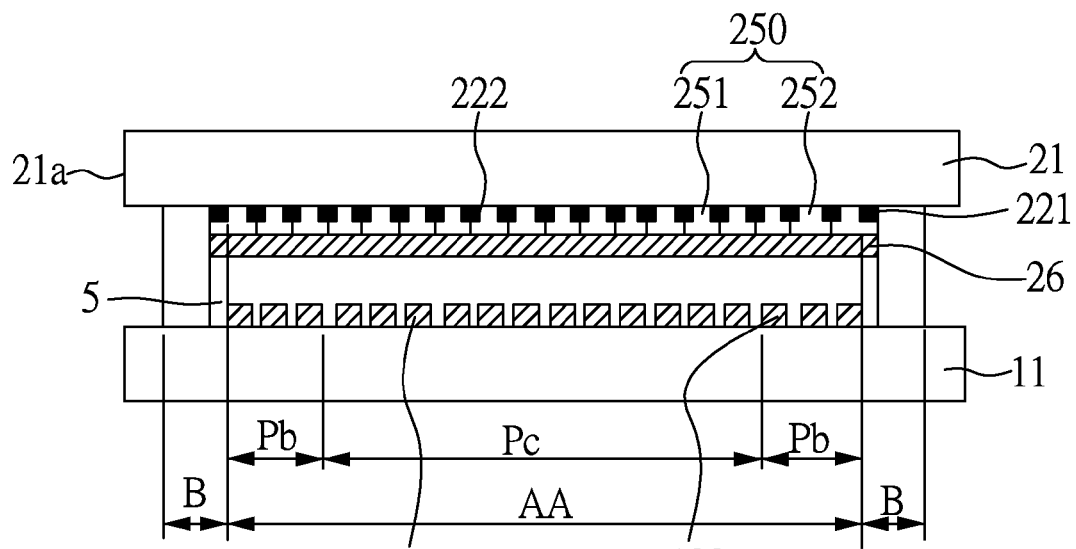
FIG. 2A shows a schematic cross-section of the free-form display panel according to an embodiment of the disclosure.

As shown in the schematic cross-section of FIG. 2A, the free-form display panel of this embodiment has a display region AA and a non-display region B out of the display region AA, wherein the display region AA has a central pixel region Pc and a border pixel region Pb disposed between the central pixel region Pc and the non-display region B. In addition, the free-form display panel of this embodiment comprises: a first substrate 21, wherein a first black matrix 221 is disposed in the non-display region B and disposed on the first substrate 21, while a second black matrix 222 is disposed in the display region AA and disposed on the first substrate 21, wherein the first black matrix 221 surrounds the second black matrix 222; a second substrate opposite to the first substrate 21; a display medium layer 5 disposed between the first substrate 21 and the second substrate 22; a plurality of central pixel units located at the central pixel region Pc and having a plurality of first electrodes 121 disposed on the second substrate 11; a plurality of border pixel units located at the border pixel region Pb and having a plurality of second electrodes 122 disposed on the second substrate 11; and a common electrode 26 disposed on the first substrate 21 and opposite to the first electrodes 121 and the second electrodes 122.

In the embodiment, the second substrate 11 can be a thin film transistor substrate, on which a thin film transistor (not shown) is disposed; and the first substrate 21 can be a color filter substrate, on which a color filter layer 250 (including a central color filter unit 251 and a border color filter unit 252) and a black matrix layer (including a first black matrix 221 and a second black matrix 222) are disposed. However, in other embodiments of the disclosure, the color filter layer 250 (including the central color filter unit 251 and the border color filter unit 252) may be disposed on the second substrate 11, as long as the central color filter unit 251 and the border color filter unit 252 are disposed on the display region AA of the second electrode 122, corresponding to the first electrode 121 and the second electrode 122, respectively. In addition, in other embodiments of the disclosure, when the display panel of the embodiment is an organic light emitting diode display panel, the color filter layer 250 may be optionally disposed or not.

Furthermore, in the embodiment, a display medium layer 5 and an alignment layer (not shown) may be further disposed between the second substrate 11 and first substrate 21, wherein the display medium layer 5 may be a liquid crystal layer, such that the display panel prepared in this embodiment is a liquid crystal display panel. However, in other embodiments of the disclosure, an organic light emitting layer may be disposed between the second substrate 11 and the first substrate 21 to form an organic light emitting diode display panel.

Furthermore, in the embodiment, the first electrode 121 and the second electrode 122 are disposed opposite to the common electrode 26, and thus the display panel in the present embodiment can be used as a twist nematic (TN) liquid crystal display panel or a vertical alignment (VA) liquid crystal display panel. Here, the first electrode 121, the second electrode 122 and the opposite electrode 26 may be made of a transparent electrode material known in the art, such as a transparent conductive oxide. Furthermore, in the embodiment, the first electrode 121 and the second electrode 122 are a plate-shaped electrode.

Figure 2B:
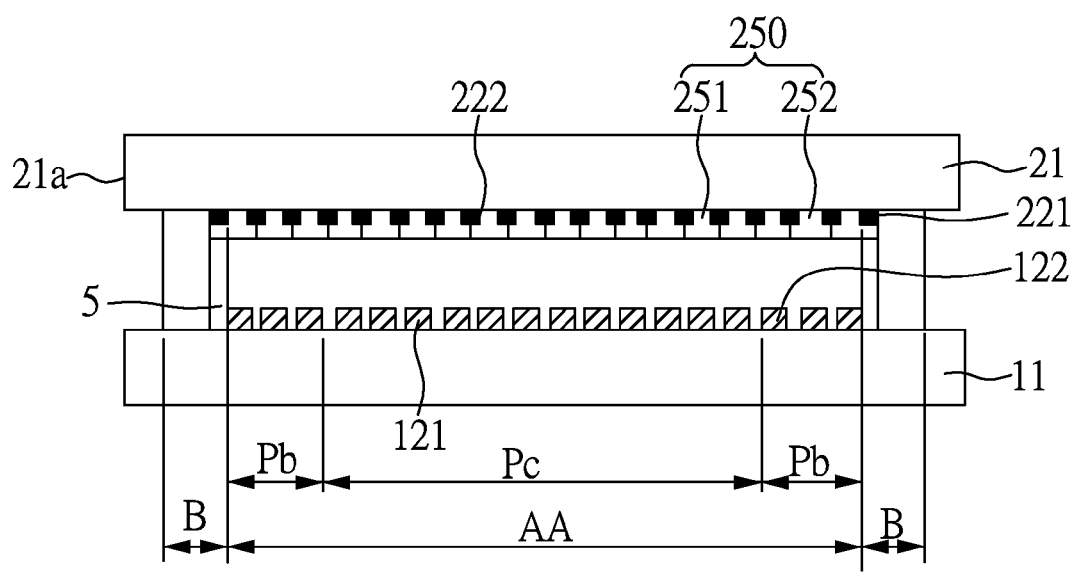
FIG. 2B shows a schematic cross-section of the free-form display panel according to an embodiment of the disclosure.

FIG. 2B shows a schematic cross-section of the free-form display panel according to another embodiment of the disclosure. The structure of the display panel in the embodiment is substantially the same as the above-mentioned embodiment shown in FIG. 2A, except that the display panel of the embodiment includes a first electrode 121 and a second electrode 122, but not the common electrode 26 shown in FIG. 2A. Thus, the display panel prepared in this embodiment may be an In-Plane-Switching (IPS) display panel or a Fringe-Field-Switching (FFS) display panel. Meanwhile, as shown in the top view of FIG. 3, the first electrode 121 and the second electrode 122 may be a comb-shaped electrode. As the first electrode 121 and the second electrode 122 are the comb-shaped electrodes including the slits 121a, 122a having a width a, the working regions of the first electrode 121 and the second electrode 122 are defined as a region formed by connecting points distanced from edges of the first electrode 122 and the second electrode 122 by the width a. Here, FIG. 3 merely shows an exemplary configuration of the first electrode 121 and the second electrode 122 applicable to the embodiment. However, in other embodiments of the disclosure, the structures of the first electrode 121 and the second electrode 122 are not limited to the structures shown in FIG. 3. For example, the first electrode 121 and the second electrode 122 may have an indented or wavy border.

Next, designs of the border pixel units of the free-form display panel shown in FIGS. 2A and 2B will be described in detail.

Comparative Embodiment 1

Figure 3:
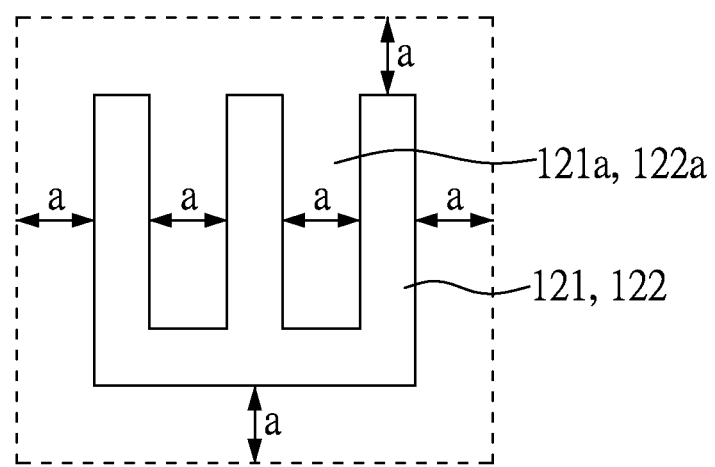
FIG. 3 shows a schematic diagram of the first electrode and the second electrode of the free-form display panel according to another embodiment of the disclosure.
Figure 4:
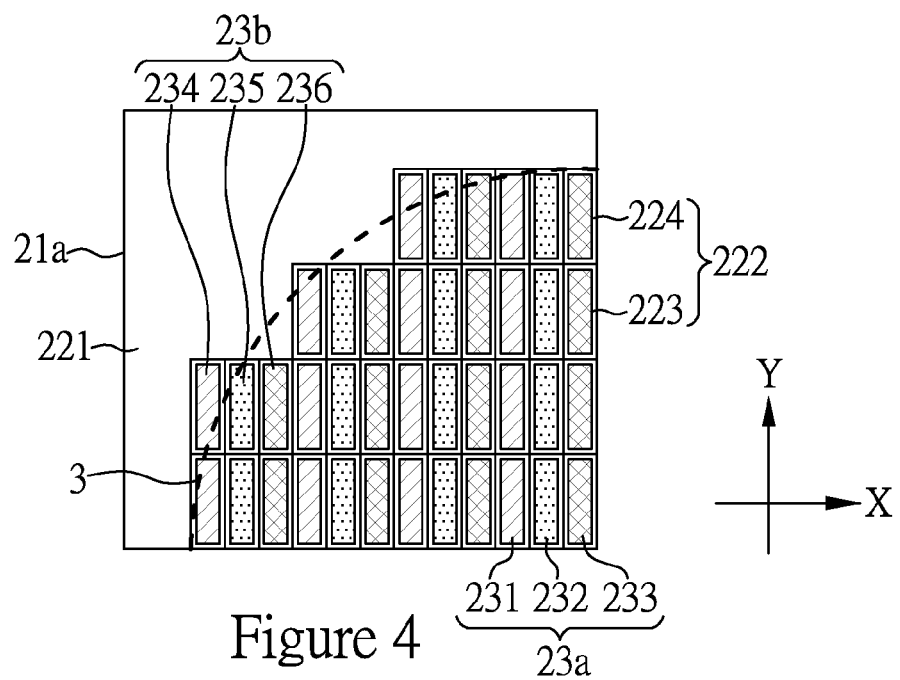
FIG. 4 shows a schematic diagram of a part of the free-form display panel according to Comparative Embodiment 1 of the disclosure.
Figure 5A:
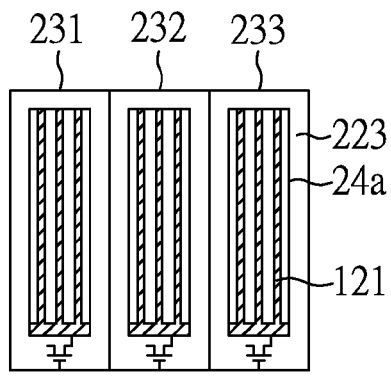
FIGS. 5A to 5D show schematic diagrams of the central pixel units and the border pixel units of the free-form display panel according to Comparative Embodiment 1 of the disclosure.
Figure 5B:
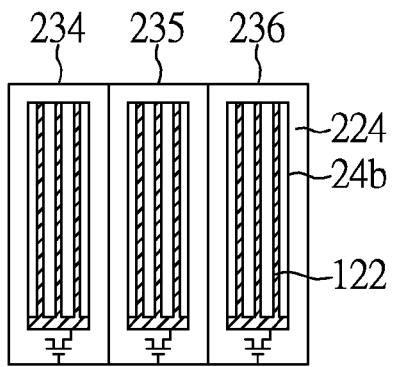
Figure 5C:
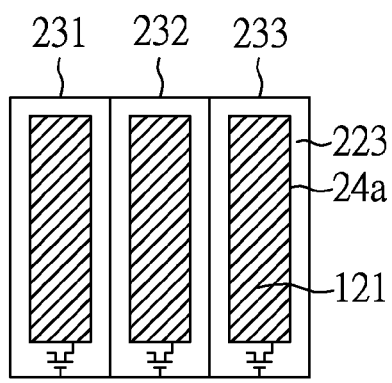
Figure 5D:
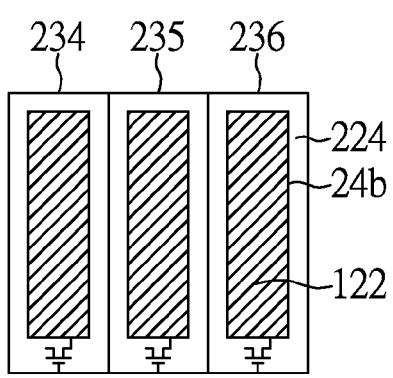

FIG. 4 shows a schematic diagram of a part of the free-form display panel according to this Comparative Embodiment, the hatched line in the pixel units represents a light output area. The free-form display panel of this Comparative Embodiment comprises: a plurality of central pixel unit 23a, each including a first central sub-pixel unit 231, a second central sub-pixel unit 232, and a third central sub-pixel unit 233, each of which correspond to the first electrode 121 (as shown in FIGS. 2A and 2B), and the central pixel units 23a are not adjacent to the first black matrix 221 as shown in the top view of FIG. 4; and a plurality of border pixel units 23b, including a first border sub-pixel unit 234, a second border sub-pixel unit 235, and a third border sub-pixel unit 236, which correspond to the second electrode 122 (as shown in FIGS. 2A and 2B), respectively, and the border pixel units 23b are adjacent to the first black matrix 221 as shown in the top view of FIG. 4. When the free-form display panel of this Comparative Embodiment has the structure as shown in FIGS. 2B and 3, the schematic diagrams of the central pixel units and the border pixel units are shown in FIGS. 5A and 5B; while when the free-form display panel of this Comparative Embodiment has the structure as shown in FIG. 2A, the schematic diagrams of the central pixel units and the border pixel units are shown in FIGS. 5C and 5D. As shown in FIGS. 5A and 5C, in at least one of the central pixel units 23a, the first central sub-pixel unit 231, a second central sub-pixel unit 232 and the third central sub-pixel unit 233 are arranged in a first direction X, and the first central sub-pixel unit 231, the second central sub-pixel unit 232 and the third central sub-pixel unit 233 correspond to the first electrode 121 (as shown in FIGS. 2A and 2B). As shown in FIGS. 5B and 5D, in at least one of the border pixel units 23b, the first border sub-pixel unit 234, the second border sub-pixel unit 235 and the third border sub-pixel unit 236 are also arranged along the first direction X, and the first border sub-pixel unit 234, the second border sub-pixel unit 235 and the third border sub-pixel unit 236 correspond to the second electrode 122 (as shown in FIGS. 2A and 2B).

In addition, as shown in the top views of FIG. 4 to FIG. 5D, the second black matrix 222 comprises a central pixel black matrix 223 and a border pixel black matrix 224, wherein the central pixel black matrix 223 spaces apart the central pixel units 23a, to form a plurality of central aperture regions 24a to expose each of the first electrodes 121 (as shown in FIGS. 2A and 2B), while the border pixel black matrix 224 spaces apart the border pixel units 23b, to form a plurality of border aperture regions 24b to expose each of the second electrodes 122 (as shown in FIGS. 2A and 2B). The first border sub-pixel unit 234 is adjacent to the first black matrix 221 and close to the edge 21a of the substrate, and the second border sub-pixel unit 235 is disposed between the first border sub-pixel unit 234 and the third sub-pixel border unit 236. Furthermore, each of the first central sub-pixel unit 231 and the first border sub-pixel unit 234 represents a first color, each of the second central sub-pixel unit 232 and the second border sub-pixel unit 235 represents a second color, while each of the third central sub-pixel unit 233 and the third border sub-pixel unit 236 represents a third color, and the first color, the second color and the third color are different. The colors represented by the first central sub-pixel unit 231 and the first border sub-pixel unit 234, the second central sub-pixel unit 232 and the second border sub-pixel unit 235, and the third central sub-pixel unit 233 and the third border sub-pixel unit 236 are determined by a color filter layer 250 as shown in FIG. 2 and FIG. 3, and the colors are not particularly limited. For example, the first color may be red, the second color may be green, and the third color may be blue, but the present invention is not limited thereto.

In addition, as shown in FIGS. 5A to 5D, the first electrode 121 and the second electrode 122 have the same structure and the same working region areas, either in the first, second, and third central sub-pixel units 231, 232, and 233 of the central pixel unit, or in the first, second, and third border sub-pixel units 234, 235, and 236 of the border pixel unit. In addition, the central aperture regions 24a and the border aperture regions 24b formed by either the central pixel black matrix 223 or the border pixel black matrix 224 have the same aperture area, such that the central pixel units 23a and the border pixel units 23b have the same light output areas. Here, the term "light output area of the central pixel units 23" refers to a product of a working region area of the first electrodes 121 exposed by the central aperture regions 24a of the central pixel black matrix 223 corresponding to the central pixel units 23 and the aperture ratio of the central pixel black matrix 223, and the term "light output area of the border pixel units 23b" refers to a product of a working region area of the second electrodes 122 exposed by the border aperture regions 24b of the border pixel black matrix 224 corresponding to the border pixel units 23b and the aperture ratio of the border pixel black matrix 224. The pixel aperture ratio of the central/border the black matrix 223, 224 is a ratio of an area of the aperture region 24a, 24b of the central/border pixel black matrix 223, 224 to an area of the central/border pixel unit region 23a, 23b, and the area of the central/border pixel unit region 23a, 23b is defined by a central line between two adjacent edges of two adjacent central/border aperture regions 24a, 24b of the central/border pixel black matrix 223, 224 corresponding to the central/border pixel unit regions 223, 224.

However, as shown in FIG. 4, since the Comparative Embodiment is a free-form display panel, the display region should ideally have the curved trend line 3 as shown in FIG. 4. However, since the border pixel units 23b and the central pixel units 23a of this Comparative Embodiment have the same structures, the curved trend line 3 as shown in FIG. 4 cannot be obtained due to the arrangement of the border pixel units 23b, thus failing to realize a display region having a free-form structure. Therefore, in the following embodiments of the invention, the display region having a free-form structure is realized by changing the designs for the border pixel unit 23b.

Embodiment 1 and Embodiment 2

Figure 6:
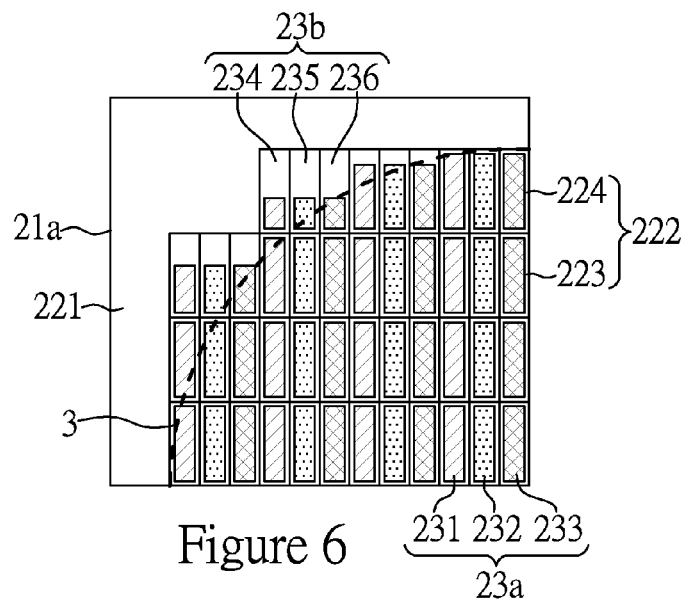
FIG. 6 shows a schematic diagram of parts of the free-form display panels according to Embodiments 1 and 2 of the disclosure.
Figures 7A, 7B, 7C:
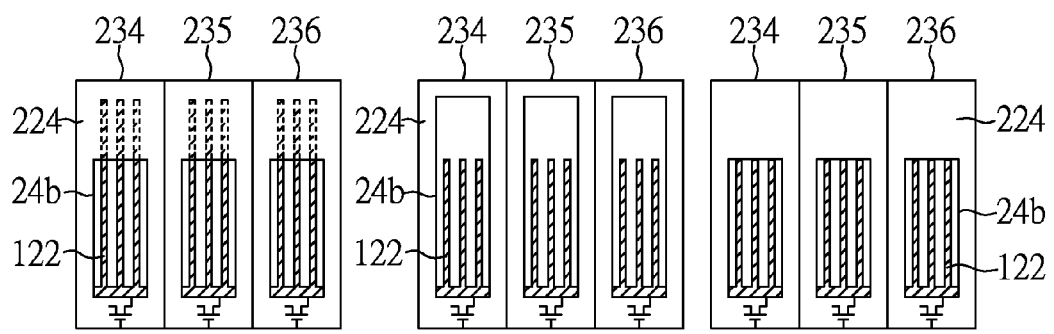
FIGS. 7A to 7C show schematic diagrams of the border pixel units of the free-form display panel according to Embodiment 1 of the disclosure.
Figures 8A, 8B, 8C:
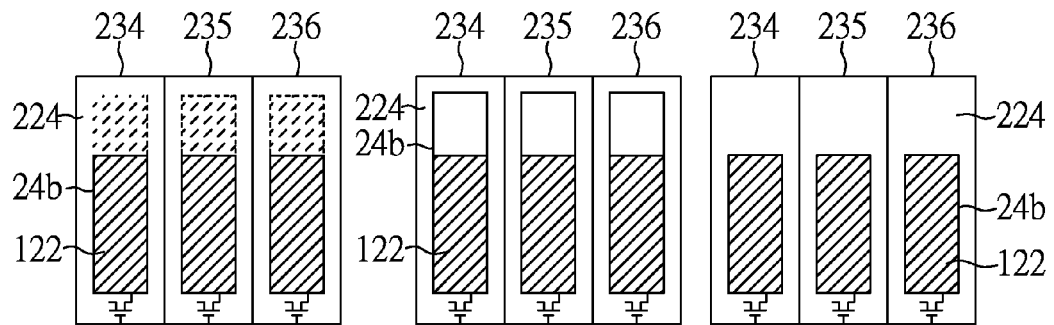
FIGS. 8A to 8C show schematic diagrams of the border pixel units of the free-form display panel according to Embodiment 2 of the disclosure.

FIG. 6 shows a schematic diagram of parts of the free-form display panels according to Embodiments 1 and 2, wherein the region represented by the hatched line in the pixel units refers to the light output area. Except for the structures of the border pixel units, other structures are the same as in Comparative Embodiment 1. When the free-form display panel of Embodiment 1 has the structure shown in FIGS. 2B and 3, the schematic diagrams of its border pixel units are shown in FIGS. 7A to 7C; and when the free-form display panel of Embodiment 2 has the structure shown in FIG. 2A, the schematic diagrams of its border pixel units are shown in FIGS. 8A to 8C. Embodiments 1 and 2 have the same central pixel unit structure as Comparative Embodiment 1, and the same features will not be repeated herein for brevity.

As shown in FIG. 7A and FIG. 8A, the aperture ratio of the border pixel black matrix 224 can be altered to make the border pixel unit more close to the curved trend line 3 shown in FIG. 6 without changing the shape of the second electrode 122, that is, the first electrode 121 and the second electrode 122 have the same structures. More specifically, in a part of the border pixel units 23b, the aperture areas of the border aperture regions 24b of the border pixel black matrix 224 corresponding to the first border sub-pixel unit 234, the second border sub-pixel unit 235 and the third border sub-pixel unit 236 are designed to be smaller than the aperture areas of the central aperture regions 24a of the central pixel black matrix 223 corresponding to the first central sub-pixel unit 231, the second central sub-pixel unit 232 and the third central sub-pixel unit 233, respectively (as shown in FIG. 5A and FIG. 5C). That is, the aperture ratio of the border pixel black matrix 224 is smaller than that of the central pixel black matrix 223, such that a part of the border pixel units 23b and the central pixel units 23a have the different light output areas.

Alternatively, as shown in FIGS. 7B and 8B, the aperture areas of the border aperture regions 24b of the border pixel black matrix 224 corresponding to the first border sub-pixel unit 234, the second border sub-pixel unit 235 and the third border sub-pixel unit 236 may be not changed, while the working region areas of the second electrodes 122 corresponding to a part of the first border sub-pixel units 234, the second border sub-pixel units 235 and the third border sub-pixel units 236 are designed to be smaller than the working region areas of the first electrodes 121 corresponding to the first central sub-pixel unit 231, the second central sub-pixel unit 232 and the third central sub-pixel unit 233, respectively.

Alternatively, as shown in FIGS. 7C and 8C, the aperture areas of the border aperture regions 24b of the border pixel black matrix 224 corresponding to the first border sub-pixel unit 234, the second border sub-pixel unit 235 and the third border sub-pixel unit 236 and the working region areas of the second electrodes 122 corresponding thereto are both designed to be smaller than the aperture areas of the central aperture regions 24a of the central pixel black matrix 223 corresponding to the first central sub-pixel unit 231, the second central sub-pixel unit 232 and the third central sub-pixel unit 233 and the working region areas of the first electrodes 121 corresponding thereto, respectively.

Embodiment 3 and Embodiment 4

Figure 9:
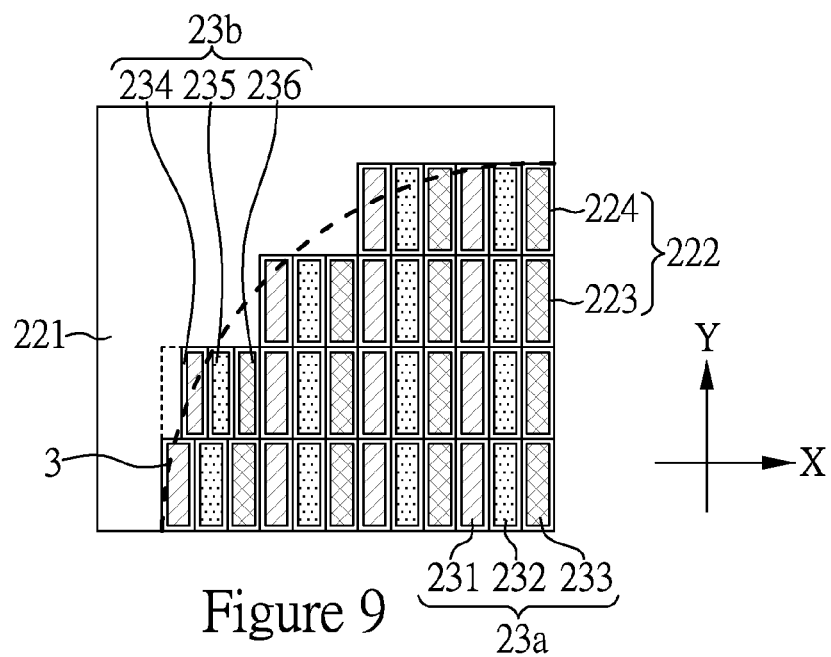
FIG. 9 shows a schematic diagram of parts of the free-form display panels according to Embodiments 3 and 4 of the disclosure.
Figure 10A:
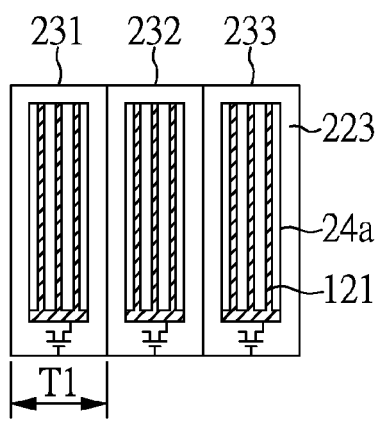
FIGS. 10A to 10B show schematic diagrams of the central pixel units and the border pixel units of the free-form display panel according to Embodiment 3 of the disclosure.
Figure 10B:
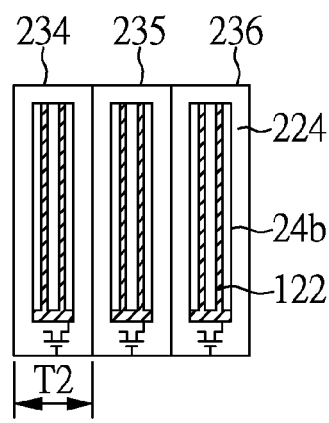
Figure 11A:
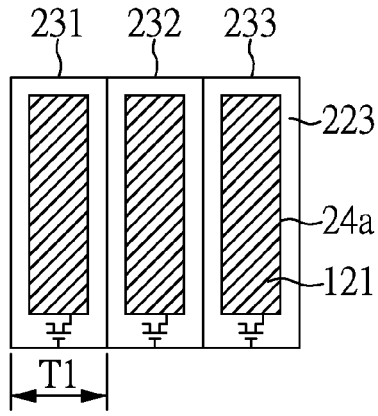
FIGS. 11A to 11B show schematic diagrams of the central pixel units and the border pixel units of the free-form display panel according to Embodiment 4 of the disclosure.
Figure 11B:
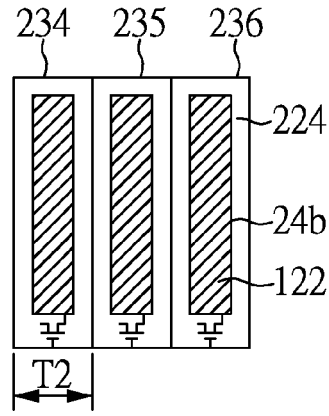

FIG. 9 shows a schematic diagram of parts of the free-form display panels according to Embodiments 3 and 4, wherein the region represented by the hatched line in the pixel units refers to the light output area. Except for the structures of the border pixel units, other structures are the same as in Comparative Embodiment 1. When the free-form display panel of Embodiment 3 has the structure shown in FIGS. 2B and 3, the schematic diagrams of its central pixel units and border pixel units are shown in FIGS. 10A to 10B; and when the free-form display panel of Embodiment 4 has the structure shown in FIG. 2A, the schematic diagrams of its central pixel units and border pixel units are shown in FIGS. 11A and 11B.

As shown in FIGS. 10A to 11B, in Embodiments 3 and 4, the first central sub-pixel unit 231, the second central sub-pixel unit 232, and the third central sub-pixel units 23 correspond to the first electrode 121, while the first border sub-pixel unit 234, the second border sub-pixel unit 235 and the third border sub-pixel unit 236 correspond to the second electrode 122, wherein the first electrode 121 and the second electrode 122 have different structures and sizes. In addition, in a part of the border pixel units 23b, widths T2 (defined by the central line of its corresponding border pixel black matrix 224) of the first border sub-pixel unit 234, the second border sub-pixel unit 235 and the third border sub-pixel unit 236 in the first direction X are designed to be smaller than widths T1 (defined by the central line of its corresponding central pixel black matrix 223) of the first central sub-pixel unit 231, the second central sub-pixel unit 232 and the third central sub-pixel unit 233 in the first direction X, respectively. That is, the widths T2 of the border aperture region of the border pixel black matrix 224 corresponding to the first border sub-pixel unit 234, the second border sub-pixel unit 235 and the third border sub-pixel unit 236 in the first direction X are designed to be smaller than the widths T1 of the central aperture region of the central pixel black matrix 224 corresponding to the first central sub-pixel unit 231, the second central sub-pixel unit 232 and the third central sub-pixel unit 233 in the first direction X, respectively. Due to the variation in the width of the border aperture region 24b in the first direction X, the working region areas of the second electrodes 122 exposed by the first border sub-pixel units 234, the second border sub-pixel units 235 and the third border sub-pixel units 236 are smaller than the working region areas of the first electrodes 121 exposed by the first central sub-pixel unit 231, the second border sub-pixel unit 232 and the third central sub-pixel unit 233. Accordingly, in Embodiments 3 and 4, a part of the border pixel units 23b and the central pixel units 23a have different light output areas.

Embodiment 5 and Embodiment 6

FIG. 12 shows a schematic diagram of parts of the free-form display panels according to Embodiments 5 and 6, wherein the region represented by the hatched line in the pixel units refers to the light output area. Except for the structures of the border pixel units, other structures are the same as in Comparative Embodiment 1. When the free-form display panel of Embodiment 5 has the structure shown in FIGS. 2B and 3, the schematic diagram of its central pixel units is shown in FIG. 13A, the schematic diagrams of its border pixel units are shown in FIGS. 13B and 13C; and when the free-form display panel of Embodiment 6 has the structure shown in FIG. 2A, the schematic diagrams of its central pixel units are shown in FIG. 14A, the schematic diagrams of its border pixel units are shown in FIGS. 14B and 14C.

By comparing FIG. 13A with FIG. 13B, or comparing FIG. 14A with FIG. 14B, it can be seen that in Embodiments 5 and 6, in a part of the border pixel units 23b, widths T2 (defined by the central line of its corresponding border pixel black matrix 224) of the first border sub-pixel unit 234, the second border sub-pixel unit 235 and the third border sub-pixel unit 236 in the first direction X are designed to be smaller than widths T1 (defined by the central line of its corresponding central pixel black matrix 223) of the first central sub-pixel unit 231, the second central sub-pixel unit 232 and the third central sub-pixel unit 233 in the first direction X, respectively. Meanwhile, widths T4 (defined by the central line of its corresponding border pixel black matrix 224) of the first border sub-pixel unit 234, the second border sub-pixel unit 235 and the third border sub-pixel unit 236 in the second direction Y are designed to be smaller than widths T3 (defined by the central line of its corresponding central pixel black matrix 223) of the first central sub-pixel unit 231, the second central sub-pixel unit 232 and the third central sub-pixel unit 233 in the second direction Y, respectively, and the second direction Y is substantially perpendicular to the first direction X. Here, the term "substantially vertical" refers to the included angle of 85 to 95 degrees between the second direction Y and the first direction X. Due to the variation in width of the border aperture region 24b in the first direction X and the second direction Y, the sizes of the second electrodes 122 exposed by the border aperture regions 24b of the border pixel black matrix 224 corresponding to the first border sub-pixel units 234, the second border sub-pixel units 235 and the third border sub-pixel units 236 are smaller than the sizes of the first electrodes 121 exposed by the central aperture regions 24a of the central pixel black matrix 223 corresponding to the first central sub-pixel unit 231, the second border sub-pixel unit 232 and the third central sub-pixel unit 233, either in the first direction X or the second direction Y. Therefore, a part of the border pixel units 23b and the central pixel units 23a have different light output areas.

Alternatively, by comparing FIG. 13A with FIG. 13C, or comparing FIG. 14A with FIG. 14C, it can be seen that in a part of the border pixel units 23b, the widths T2 (defined by the central line of its corresponding border pixel black matrix 224) of the first border sub-pixel unit 234, the second border sub-pixel unit 235 and the third border sub-pixel unit 236 in the first direction X are designed to be smaller than the widths T1 (defined by the central line of its corresponding central pixel black matrix 223) of the first central sub-pixel unit 231, the second central sub-pixel unit 232 and the third central sub-pixel unit 233 in the first direction X, respectively; while the widths T3 (defined by the central line of its corresponding border pixel black matrix 224) of the first border sub-pixel unit 234, the second border sub-pixel unit 235 and the third border sub-pixel unit 236 in the second direction Y are the same as the widths T3 (defined by the central line of its corresponding central pixel black matrix 223) of the first central sub-pixel unit 231, the second central sub-pixel unit 232 and the third central sub-pixel unit 233 in the second direction Y, respectively. Meanwhile, the widths of the border aperture regions 24b of the border pixel black matrix 224 corresponding to the first border sub-pixel units 234, the second border sub-pixel units 235 and the third border sub-pixel units 236 are designed to be smaller than the widths of the central aperture regions 24a of the central pixel black matrix 223 corresponding to the first central sub-pixel unit 231, the second central sub-pixel unit 232 and the third central sub-pixel unit 233 in the first direction X and the second direction Y. Due to the variation in width of the border aperture region 24b in the first direction X and the second direction Y, the working region areas of the second electrodes 122 exposed by the first border sub-pixel units 234, the second border sub-pixel units 235 and the third border sub-pixel units 236 are smaller than the working region areas of the first electrodes 121 exposed by the first central sub-pixel unit 231, the second central sub-pixel unit 232 and the third central sub-pixel unit 233. As such, the working region areas of the exposed second electrodes 122 as in FIGS. 13B and 14B can be achieved and a part of the border pixel units 23b and the central pixel units 23a can have different light output areas.

Embodiment 7 and Embodiment 8

Figure 15:
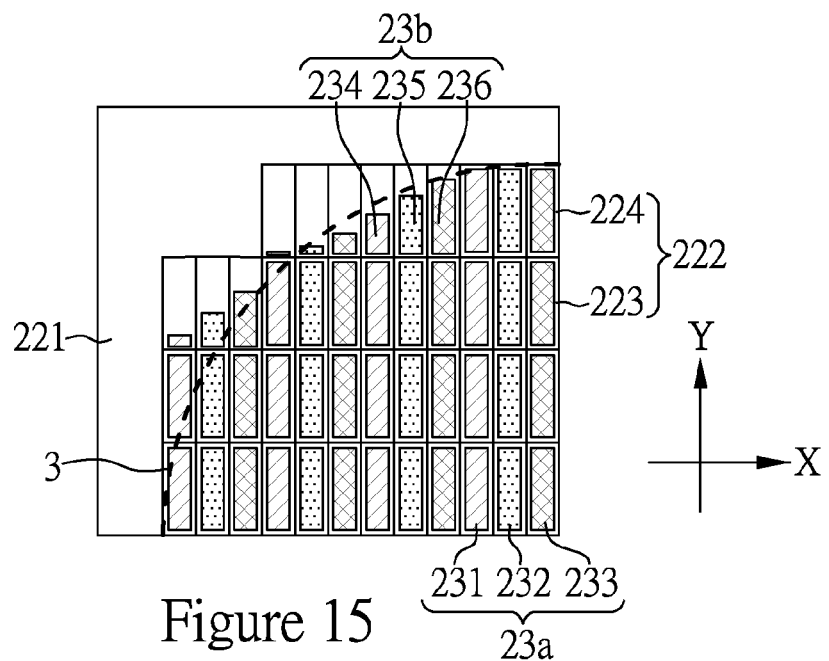
FIG. 15 shows a schematic diagram of parts of the free-form display panels according to Embodiments 7 and 8 of the disclosure.
Figure 16A:
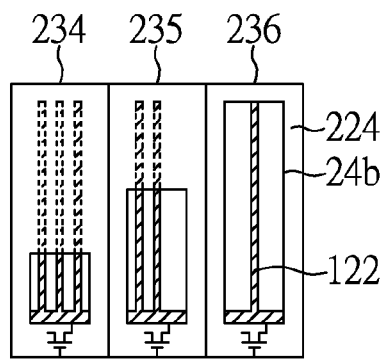
FIGS. 16A to 16B show schematic diagrams of the border pixel units of the free-form display panel according to Embodiment 7 of the disclosure.
Figure 16B:
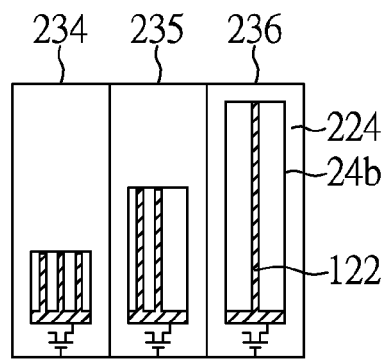
Figure 17A:
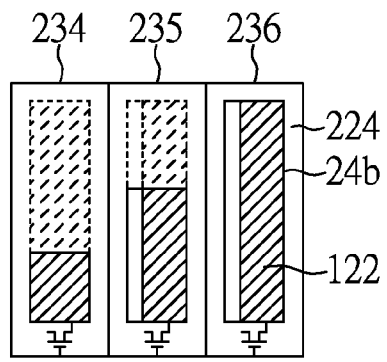
FIGS. 17A to 17B show schematic diagrams of the border pixel units of the free-form display panel according to Embodiment 8 of the disclosure.
Figure 17B:
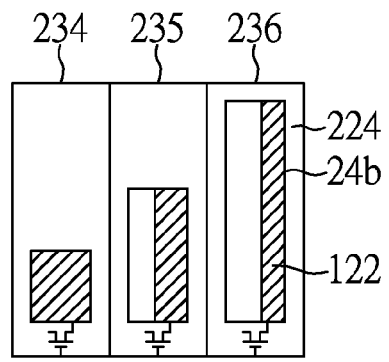

FIG. 15 shows a schematic diagram of parts of the free-form display panels according to Embodiments 7 and 8, wherein the region represented by the hatched line in the pixel units refers to the light output area. Except for the structures of the border pixel units, other structures are the same as in Comparative Embodiment 1. When the free-form display panel of Embodiment 7 has the structures of the first electrodes 121 and the second electrodes 122 shown in FIGS. 2B and 3, the schematic diagrams of its border pixel units are shown in FIGS. 16A to 16B; and when the free-form display panel of Embodiment 8 has the structures of the first electrodes 121 and the second electrodes 122 shown in FIG. 2A, the schematic diagrams of its border pixel units are shown in FIGS. 17A to 17B. Embodiments 7 and 8 have the same central pixel unit structure as Comparative Embodiment 1, and the same features will not be repeated herein for brevity.

As shown in FIGS. 16A and 17A, the size of the second electrode 122 in the second direction Y may be not changed, but its size in the first direction X is changed. For example, as shown in FIG. 16A, the number of the comb-shaped electrode strip portions of the second electrode 122 is reduced, or as shown in FIG. 17A, the width of the second electrode 122 in the first direction X is reduced. Meanwhile, in order to achieve the same working region areas of the second electrodes 122 exposed by the first border sub-pixel units 234, the second border sub-pixel units 235 and the third border sub-pixel units 236, the area of the border aperture region 24b of the border pixel black matrix 224 corresponding to the first border sub-pixel units 234 may be designed to be smaller than the area of the border aperture region 24b of the border pixel black matrix 224 corresponding to the second border sub-pixel units 235, while the area of the border aperture region 24b of the border pixel black matrix 224 corresponding to the second border sub-pixel units 235 may be designed to be smaller than the area of the border aperture region 24b of the border pixel black matrix 224 corresponding to the third border sub-pixel units 236. In addition, the areas of the border aperture regions 24b of the border pixel black matrix 224 corresponding to the first border sub-pixel units 234, the second border sub-pixel units 235 and the third border sub-pixel units 236 are smaller than the areas of the central aperture regions 24a of the central pixel black matrix 223 corresponding to the first central sub-pixel unit 231, the second central sub-pixel unit 232 and the third central sub-pixel unit 233, respectively (as shown in FIG. 5A and FIG. 5C). Accordingly, a part of the border pixel units 23b and the central pixel units 23a have different light output areas Alternatively, as shown in FIGS. 16B and 17B, the sizes of the second electrode 122 in the first direction X and the second direction Y may be both changed to achieve the same working region areas of the second electrodes 122 exposed by the first border sub-pixel units 234, the second border sub-pixel units 235 and the third border sub-pixel units 236. The border aperture regions 24b of the border pixel black matrix 224 corresponding to the first border sub-pixel units 234, the second border sub-pixel units 235 and the third border sub-pixel units 236 are the same as those shown in FIGS. 16A and 17A. Accordingly, a part of the border pixel units 23b and the central pixel units 23a have different light output areas.

Embodiment 9 and Embodiment 10

Figure 18:
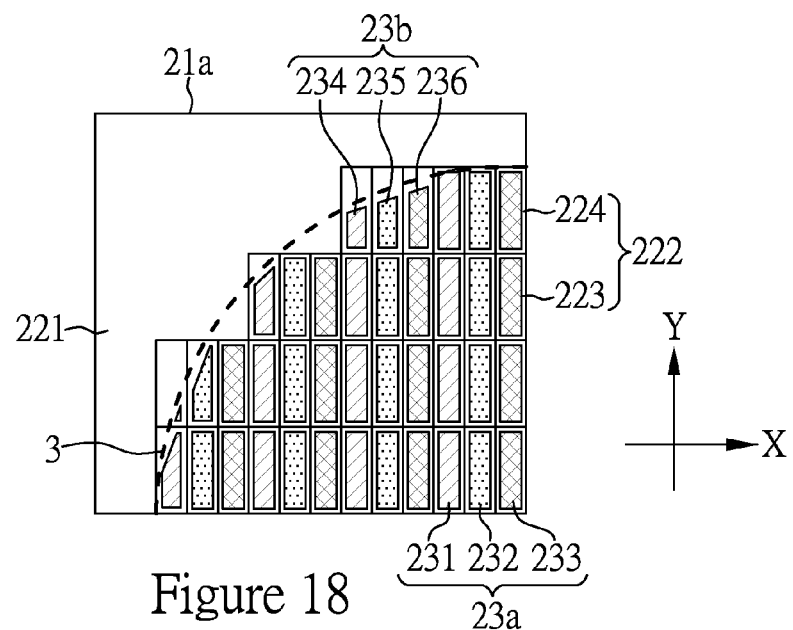
FIG. 18 shows a schematic diagram of parts of the free-form display panels according to Embodiments 9 and 10 of the disclosure.
Figure 19:
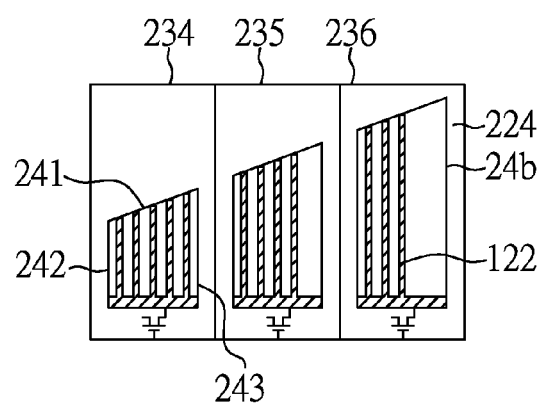
FIG. 19 shows a schematic diagram of the border pixel units of the free-form display panel according to Embodiment 9 of the disclosure.
Figure 20:
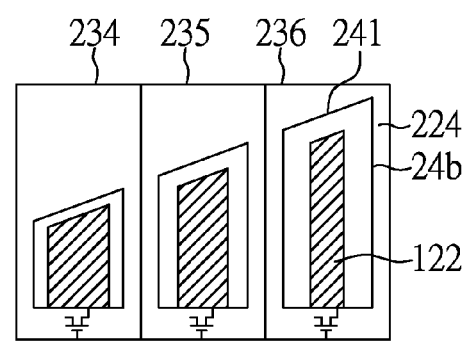
FIG. 20 shows a schematic diagram of the border pixel units of the free-form display panel according to Embodiment 10 of the disclosure.

FIG. 18 shows a schematic diagram of parts of the free-form display panels according to Embodiments 9 and 10, wherein the region represented by the hatched line in the pixel units refers to the light output area. Except for the structures of the border pixel units, other structures are the same as in Comparative Embodiment 1. When the free-form display panel of Embodiment 9 has the structure shown in FIGS. 2B and 3, the schematic diagram of its border pixel units is shown in FIG. 19; and when the free-form display panel of Embodiment 10 has the structure shown in FIG. 2A, the schematic diagram of its border pixel units is shown in FIG. 20. Embodiments 9 and 10 have the same central pixel unit structure as Comparative Embodiment 1, and the same features will not be repeated herein for brevity.

As shown in FIG. 18 to FIG. 20, in Embodiments 9 and 10, in order to make the arrangement of the border pixel units 23b has the curved trend line 3 as shown in FIG. 18, at least one of the border aperture regions 24b of the border pixel black matrix 224 corresponding to the first border sub-pixel units 234, the second border sub-pixel units 235 and the third border sub-pixel units 236 comprises a first side 242 and a second side 243 substantially parallel to the first side 242, and a beveled edge 241 intersects and is included between the first side 242 and the second side 243. In the same border pixel unit 23b, the beveled edges 241 of each of the first border sub-pixel unit 234, the second border sub-pixel unit 235, and the third border sub-pixel unit most close to the edge 21b of the first substrate 21 have the same included angle with respect to the first direction X, and the included angle is less than 90 degrees. That is, the aperture regions 24 of the first border sub-pixel units 234, the second border sub-pixel units 235 and the third sub-pixel units 236 are in a shape of a trapezoid, wherein the beveled edges 241 are adjacent to the first black matrix 221. Preferably, the area of the border aperture region 24b of the border pixel black matrix 224 corresponding to the first border sub-pixel units 234 is designed to be smaller than the area of the border aperture region 24b of the border pixel black matrix 224 corresponding to the second border sub-pixel units 235, while the area of the border aperture region 24b of the border pixel black matrix 224 corresponding to the second border sub-pixel units 235 is smaller than the area of the border aperture region 24b of the border pixel black matrix 224 corresponding to the third border sub-pixel units 236; and more preferably, the beveled edges 241 of the first border sub-pixel unit 234, the second border sub-pixel unit 235, and the third border sub-pixel unit most close to the edge 21b of the first substrate 21 may be connected in a straight line.

In addition, the sizes of the second electrode 122 in the first direction X and second direction Y may be further changed. For example, as shown in FIG. 19, the number of strip portions of the comb-shaped electrode of the second electrode 122 and the sizes of the second electrode 122 are reduced, or as shown in FIG. 20, the widths of the second electrode 122 in the first direction X and second direction Y are reduced, to make the first border sub-pixel units 234, the second border the sub-pixel units 235 and the third border sub-pixel units 236 have substantially the same light output areas. Furthermore, the aperture areas of the border aperture regions 24b of the border pixel black matrix 224 corresponding to the first border sub-pixel unit 234, the second border sub-pixel unit 235 and the third border sub-pixel unit 236 are smaller than the aperture areas of the central aperture regions 24a of the central pixel black matrix 223 corresponding to the first central sub-pixel unit 231, the second central sub-pixel unit 232 and the third central sub-pixel unit 233, respectively (as shown in FIG. 5A and FIG. 5C).

Embodiment 11

Figure 21:
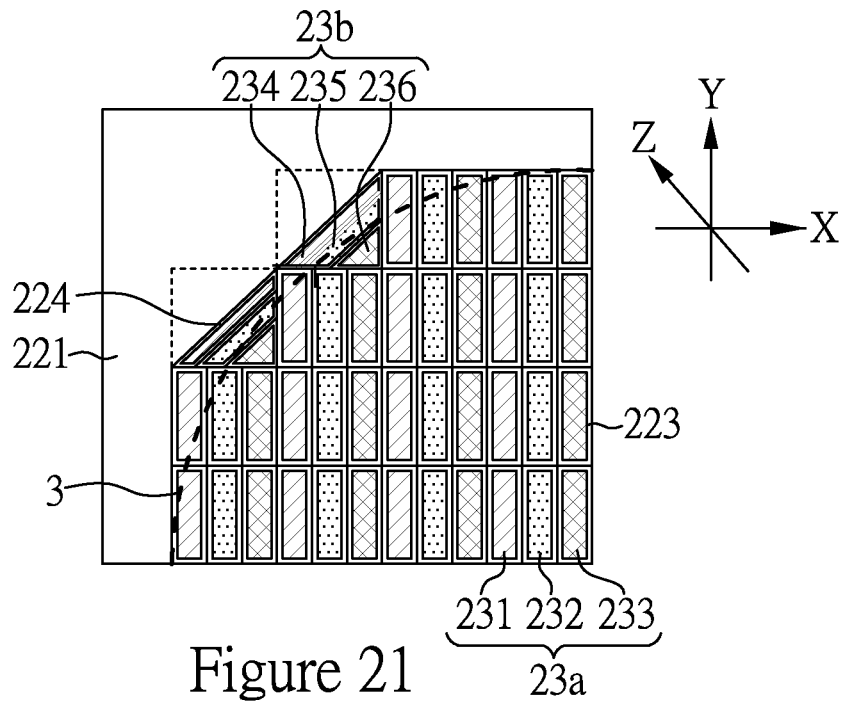
FIG. 21 shows a schematic diagram of a part of the free-form display panel according to Embodiment 11 of the disclosure.
Figure 22:
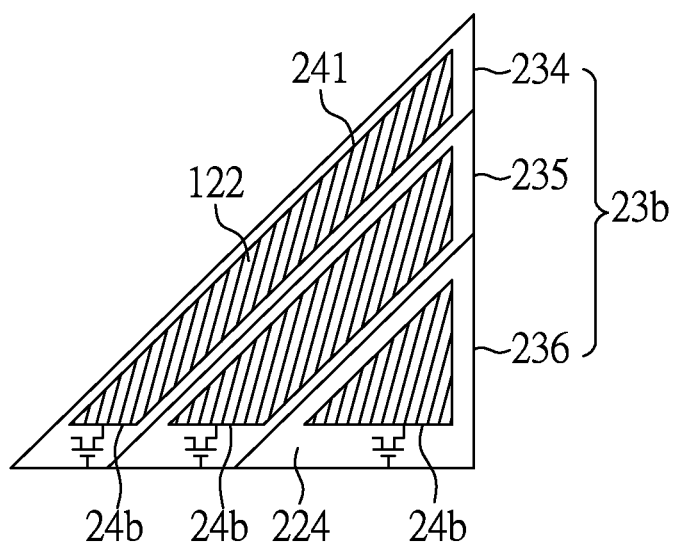
FIG. 22 shows a schematic diagram of the border pixel units of the free-form display panel according to Embodiment 11 of the disclosure.

FIG. 21 shows a schematic diagram of parts of the free-form display panels according to this embodiment, wherein the region represented by the hatched line in the pixel units refers to the light output area. Except for the structures of the border pixel units, other structures are the same as in Comparative Embodiment 1. When the free-form display panel of this embodiment has the structure shown in FIG. 2A, the schematic diagram of its border pixel units is shown in FIG. 22. This embodiment has the same central pixel unit structure as Comparative Embodiment 1, and the same features will not be repeated herein for brevity.

As shown in FIG. 22, in this embodiment, in order to make the border pixel units 23b after arrangement have the curved trend line 3 as shown in FIG. 18. In a part of the border pixel units 23b, the first border sub-pixel units 234, the second border sub-pixel units 235 and the third border sub-pixel units 236 may be arranged along a third direction Z, and the third direction Z are different from the first direction X and the second direction Y. Here, the third direction Z is at an angle of 45 degrees with respect to the first direction X and the second direction Y, respectively. However, in other embodiments of the present invention, the third direction Z and the first direction X may have an included angle of 10 to 80 degrees. In addition, the beveled edges 241 of the first border sub-pixel unit 234, the second border sub-pixel unit 235, and the third border sub-pixel unit are parallel to each other. In this embodiment, the beveled edges 241 of the border aperture region 24b of the border pixel black matrix 224 corresponding to the first border sub-pixel unit 234, the second border sub-pixel unit 235, and the third border sub-pixel units 236 have the same included angles with respect to the first direction X, respectively. More specifically, the central pixel units 23a represent a rectangle, and the border pixel units 23b represent a triangle. In particular, the first border sub-pixel line units 234 are adjacent to the first black matrix 221, and the second border sub-pixel units 235 are disposed between the first border sub-pixel line units 234 and the third border sub-pixel units 236. The first border sub-pixel units 234 and the second border sub-pixel units 235 both represent a trapezoid, while the third border sub-pixel units 236 is in a shape of a triangle. Furthermore, in this embodiment, the working region areas 24b of the second electrodes 122 exposed by the first border sub-pixel units 234, the second border sub-pixel units 235 and the third border sub-pixel units 236 are substantially the same.

In the Embodiments 1 to 10 of the present invention, the term "substantially round" refers to a nearly round shape; and the term "round" is not limited to a right round, and may be a flat round (i.e., an oval). The term "the working areas are substantially the same" refers to a difference of the working areas of the first electrode corresponding to the sub-pixel units of less than 10%.

In the foregoing Embodiments 1 to 11, by changing the light output areas of a part of the border pixel units 23b, a part of the border pixel units 23b and the central pixel units 23a have different light output areas, thereby achieving the purpose of the free-form display. In this case, the so-called "light output area of the central pixel units 23" refers to a product of a working region area of the first electrodes 121 exposed by the central aperture regions 24a of the central pixel black matrix 223 corresponding to the central pixel units 23 and the aperture ratio of the central pixel black matrix 223, and the so-called "light output area of the border pixel units 23b" refers to a product of a working region area of the second electrodes 122 exposed by the border aperture regions 24b of the border pixel black matrix 224 corresponding to the border pixel units 23b and the aperture ratio of the border pixel black matrix 224. The pixel aperture ratio of the central/border the black matrix 223, 224 is a ratio of an area of the aperture region 24a, 24b of the central/border pixel black matrix 223, 224 to an area of the central/border pixel unit region 23a, 23b. Furthermore, in the foregoing Embodiments 1 to 11, the first border sub-pixel units 234, the second border sub-pixel units 235 and the third border sub-pixel units 236 have substantially the same light output areas; whereby avoiding the abnormal color display of the border pixel units 23b. Here, the so-called "the light output areas are substantially the same" refers to the light output areas of the sub-pixel units having differences less than 10%.

In the Embodiments 1 to 11, the central aperture region 24a of the central pixel black matrix 223 corresponding to one of the first central sub-pixel units 231, the second central sub-pixel units 232 and the third central sub-pixel units 233 and the area of the working region of its corresponding first electrode 121 are O and W, respectively. In a part of the border pixel units 23b, the border aperture region 24a of the border pixel black matrix 224 corresponding to one of the first border sub-pixel units 234, the second border sub-pixel units 235 and the third border sub-pixel units 236 and the area of the working region of its corresponding second electrode 122 are O' and W', respectively, and O, O', W and W' comply with the following Equation (I):

$$(O \times W)/(O' \times W') > 1 \tag{I}.$$

Preferably, the central aperture region 24a of the central pixel black matrix 223 corresponding to the first central sub-pixel units 231 and the area of the working region of its corresponding first electrode 121 are OR and WR, respectively; the central aperture region 24a of the central pixel black matrix 223 corresponding to the second central sub-pixel units 232 and the area of the working region of its corresponding first electrode 121 are OG and WG, respectively; the central aperture region 24a of the central pixel black matrix 223 corresponding to the third central sub-pixel units 233 and the area of the working region of its corresponding first electrode 121 are OB and WB, respectively. In a part of the border pixel units 23b, the border aperture region 24b of the border pixel black matrix 224 corresponding to the first border sub-pixel units 234 and the area of the working region of its corresponding second electrode 122 are OR' and WR', respectively; the border aperture region 24b of the border pixel black matrix 224 corresponding to the second border sub-pixel units 235 and the area of the working region of its corresponding second electrode 122 are OG' and WG', respectively; the border aperture region 24b of the border pixel black matrix 224 corresponding to the third border sub-pixel units 236 and the area of the working region of its corresponding second electrode 122 are OB' and WB', respectively. OR', WR', OG', WG', OB', WB', OR, WR, OG, WG, OB and WB comply with the following Equation (II):

$$(OR \times WR)/(OR' \times WR') = (OG \times WG)/(OG' \times WG) = (OB \times WB)/(OB' \times WB') > 1 \tag{II}.$$

Comparative Embodiment 2

Figure 23:
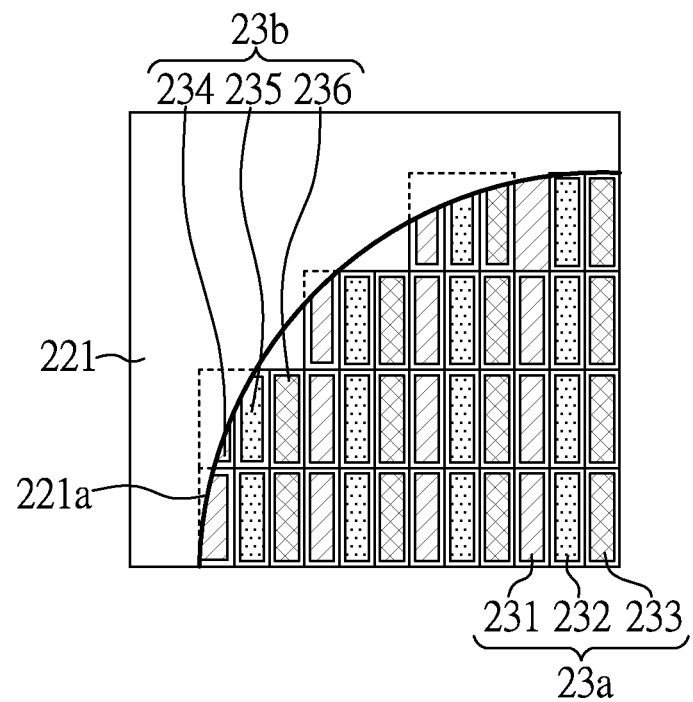
FIG. 23 shows a schematic diagram of a part of the free-form display panel according to Comparative Embodiment 2 of the disclosure.
Figure 24:
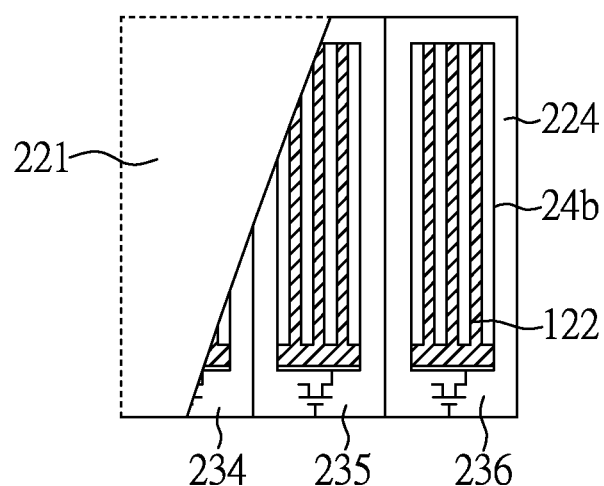
FIG. 24 shows a schematic diagram of the border pixel units of the free-form display panel according to Comparative Embodiment 2 of the disclosure.

FIG. 23 shows a schematic diagram of parts of the free-form display panels according to this comparative embodiment, wherein the region represented by the hatched line in the pixel units refers to the light output area. Except for the structures of the border pixel units, other structures are the same as in Comparative Embodiment 1. When the free-form display panel of this comparative embodiment has the structure shown in FIG. 2B, the schematic diagram of its border pixel units is shown in FIG. 24. This embodiment has the same central pixel unit structure as Comparative Embodiment 1, and the same features will not be repeated herein for brevity.

As shown in FIG. 23, in this comparative embodiment, the border color filter unit 252 is designed to have a curved border 221*a*. However, in this case, as shown in FIG. 24, the areas of the second electrodes 122 exposed by the border aperture regions 24*b* of the border pixel black matrix 224 corresponding to the third border sub-pixel units 236, the second border sub-pixel units 235 and the first border sub-pixel units 234 sequentially decrease, resulting in the different areas of the second electrodes 122 exposed by the border aperture regions 24*b* of the border pixel black matrix 224 corresponding to the first border sub-pixel units 234, the second border sub-pixel units 235 and the third border sub-pixel units 236, such that color display of the border color pixel units 23*b* may be abnormal.

In the Embodiments 1 to 11, by changing the sizes of the first border sub-pixel units, the second border sub-pixel units and the third border sub-pixel units or the aperture region areas of the border pixel black matrix corresponding thereto may be changed, to make, the arrangement of the border pixel units 23*b* can be close to the curved trend line 3 as shown in FIGS. 6, 9, 12, 15, 18 and 21. As such, the display region having a free-form structure may be truly achieved when compared to Comparative Embodiment 1. In addition, when working region areas of the second electrodes exposed by the border aperture regions of the border pixel black matrix corresponding to the first border sub-pixel units, the second border sub-pixel units and the third border sub-pixel units are substantially the same, although the sizes of the first border sub-pixel units, the second border sub-pixel units and the third border sub-pixel units are changed, or the aperture region areas of the border pixel black matrix corresponding thereto are changed, the first border sub-pixel units, the second border sub-pixel units and the third border sub-pixel units are still substantially the same, to emit the similar brightness with each other. Accordingly, the problem of color deviation due to the different brightness between the pixels caused by size changes in the pixel units or aperture region areas as in Comparative Embodiment 2 can be solved.

Moreover, the display panel of the present invention may be applied to any electronic device known in the art, such as a monitor, mobile a phone, a notebook computer, a video camera, a camera, a music player, a mobile navigation device, a television, a watch and the like.

While the disclosure has been shown and described with reference to certain exemplary examples thereof, it will be understood by those skilled in the art that various changes in form and details may be made therein without departing from the scope of the invention as defined by the appended claims.

What is claimed is:

1. A display panel, having a display region and a non-display region out of the display region, wherein the display region comprises a central pixel region and a border pixel region disposed between the central pixel region and the non-display region, the display panel comprising:
 a first substrate;
 a second substrate opposite to the first substrate;
 a display medium layer disposed between the first substrate and the second substrate;
 a plurality of central pixel units located at the central pixel region and having a plurality of first electrodes disposed on the second substrate; and
 a plurality of border pixel units located at the border pixel region and having a plurality of second electrodes disposed on the second substrate;
 wherein outmost edges of a part of adjacent border pixel units form a ladder-like shape, and a light output area of at least one of the border pixel units is smaller than that of at least one of the central pixel units.

2. The display panel of claim 1, wherein the first electrodes and the second electrodes have the same structures.

3. The display panel of claim 1, wherein a part of the second electrodes and the first electrodes have different structures.

4. The display panel of claim 1, further comprising:
 a first black matrix located at the non-display region and disposed on the first substrate; and
 a second black matrix located at the display region and disposed on the first substrate, wherein the second black matrix comprises a central pixel black matrix and a border pixel black matrix;
 wherein the central pixel black matrix spaces apart the central pixel units to form a plurality of central aperture regions to expose each of the first electrodes, while the border pixel black matrix spaces apart the border pixel units to form a plurality of border aperture regions to expose each of the second electrodes.

5. The display panel of claim 4, wherein the light output area of the central pixel units is a product of a working region area of the first electrodes exposed by the central aperture regions of the central pixel black matrix and the aperture ratio of the central pixel black matrix, while the light output area of the border pixel units is a product of a working region area of the second electrodes exposed by the border aperture regions of the border pixel black matrix and the aperture ratio of the border pixel black matrix.

6. The display panel of claim 4, wherein at least one of the border aperture regions corresponding to the border pixel units comprises a first side and a second side substantially parallel to the first side, and a beveled edge intersects and is included between the first side and the second side.

7. The display panel of claim 1, wherein at least one of the central pixel units comprises a first central sub-pixel unit, a second central sub-pixel unit and a third central sub-pixel unit, and at least one of the border pixel units comprises a first border sub-pixel unit, a second border sub-pixel unit and a third border sub-pixel unit, wherein each of the first central sub-pixel unit and the first border sub-pixel unit presents a first color, each of the second central sub-pixel unit and the second border sub-pixel unit presents a second color, and each of the third central sub-pixel unit and the third border sub-pixel unit presents a third color, wherein the first color, the second color and the third color are different.

8. The display panel of claim 7, wherein light output areas of the first border sub-pixel unit, the second border sub-pixel unit and the third border sub-pixel unit are smaller than those of the first central sub-pixel unit, the second central sub-pixel unit and the third central sub-pixel unit, respectively.

9. The display panel of claim 7, wherein in one of the border pixel units, the first border sub-pixel unit, the second border sub-pixel unit and the third border sub-pixel unit have substantially the same light output areas.

10. The display panel of claim 4, wherein in a part of the border pixel units, the border aperture regions of the border pixel black matrix corresponding to the first border sub-pixel unit, the second border sub-pixel unit and the third border sub-pixel unit are smaller than the central aperture regions of the central pixel black matrix corresponding to the first central sub-pixel unit, the second central sub-pixel unit and the third central sub-pixel unit, respectively.

11. The display panel of claim 4, wherein in a part of the border pixel units, working regions of the second electrodes exposed by the border aperture regions of the border pixel black matrix corresponding to the first border sub-pixel unit, the second border sub-pixel unit and the third border sub-pixel unit are smaller than working regions of the first electrodes exposed by the central aperture regions of the central pixel black matrix corresponding to the first central sub-pixel unit, the second central sub-pixel unit and the third central sub-pixel unit, respectively.

12. The display panel of claim 8, wherein the first central sub-pixel unit, the second central sub-pixel unit and the third central sub-pixel unit are arranged along a first direction, and the first border sub-pixel unit, the second border sub-pixel unit and the third border sub-pixel unit are arranged along the first direction, wherein widths of the first border sub-pixel unit, the second border sub-pixel unit and the third border sub-pixel unit in the first direction are smaller than widths of the first central sub-pixel unit, the second central sub-pixel unit and the third central sub-pixel unit in the first direction, respectively.

13. The display panel of claim 8, wherein the first central sub-pixel unit, the second central sub-pixel unit and the third central sub-pixel unit are arranged along a first direction, and the first border sub-pixel unit, the second border sub-pixel unit and the third border sub-pixel unit are arranged along the first direction, wherein widths of the first border sub-pixel unit, the second border sub-pixel unit and the third border sub-pixel unit in a second direction are smaller than widths of the first central sub-pixel unit, the second central sub-pixel unit and the third central sub-pixel unit in the second direction, respectively, and the second direction is substantially perpendicular to the first direction.

14. The display panel of claim 4, wherein in a part of the border pixel units, the first border sub-pixel unit, the second border sub-pixel unit and the third border sub-pixel unit are arranged sequentially along a first direction, wherein outmost edges of the first border sub-pixel unit, the second border sub-pixel unit and the third border sub-pixel unit form a ladder-like shape, and the border aperture region of the border pixel black matrix corresponding to the first border sub-pixel unit is smaller than the border aperture region of the border pixel black matrix corresponding to the second border sub-pixel unit, while the border aperture region of the border pixel black matrix corresponding to the second border sub-pixel unit is smaller than the border aperture region of the border pixel black matrix corresponding to the third border sub-pixel unit.

15. A display panel, having a display region and a non-display region out of the display region, wherein the display region comprises a central pixel region and a border pixel region disposed between the central pixel region and the non-display region, the display panel comprising:
a first substrate;
a second substrate opposite to the first substrate;
a display medium layer disposed between the first substrate and the second substrate;
a plurality of central pixel units located at the central pixel region and having a plurality of first electrodes disposed on the second substrate; and
a plurality of border pixel units located at the border pixel region and having a plurality of second electrodes disposed on the second substrate;
wherein at least one of the central pixel units comprises a first central sub-pixel unit, a second central sub-pixel unit, and a third central sub-pixel unit, while at least one of the border pixel units includes a first border sub-pixel unit, a second border sub-pixel unit, and a third border sub-pixel unit, and
the first central sub-pixel unit, the second central sub-pixel unit and the third central sub-pixel unit are arranged along a first direction, while the first border sub-pixel unit, the second border sub-pixel unit and the third border sub-pixel unit are arranged along a third direction, wherein the third direction forms an included angle with respect to the first direction, and sides of the first border sub-pixel unit, the second border sub-pixel unit and the third border sub-pixel unit intersecting the first direction are parallel to each other.

16. The display panel of claim 15, wherein the included angle is between 10 degrees to 80 degrees.

17. The display panel of claim 15, wherein the sides of the first border sub-pixel unit, the second border sub-pixel unit and the third border sub-pixel unit have the same included angle with respect to the first direction.

18. The display panel of claim 15, wherein the central pixel units are in a shape of a rectangle, and the border pixel units are in a shape of a triangle.

19. The display panel of claim 17, further comprising a first black matrix located at the non-display region and disposed on the first substrate;
wherein the first border sub-pixel unit is adjacent to the first black matrix, and the second border sub-pixel unit is disposed between the first border sub-pixel unit and the third border sub-pixel unit, wherein each of the first border sub-pixel unit and the second border sub-pixel unit is in a shape of a trapezoid, while the third border sub-pixel unit border is in a shape of a triangle.

20. The display panel of claim 17, further comprising a second black matrix located at the display region and disposed on the first substrate;
wherein the second black matrix includes a central pixel black matrix and a border pixel black matrix, wherein the central pixel black matrix spaces apart the central pixel units to form a plurality of central aperture regions to expose each of the first electrodes, while the border pixel black matrix spaces apart the border pixel units to form a plurality of aperture regions to expose each of the second electrodes;
wherein in one of the border pixel units, the first border sub-pixel unit, the second border sub-pixel unit and the third border sub-pixel unit have substantially the same light output areas.

* * * * *